United States Patent [19]
Priebe et al.

[11] Patent Number: 5,986,605
[45] Date of Patent: Nov. 16, 1999

[54] METHOD FOR IMPROVING MONOPULSE PROCESSING OF APERTURE SEGMENT OUTPUTS

[75] Inventors: Leslie A. Priebe; Jerry D. Holmes, both of Plano, Tex.

[73] Assignee: Raytheon Company, Lexington, Mass.

[21] Appl. No.: 09/056,070

[22] Filed: Apr. 6, 1998

Related U.S. Application Data

[60] Provisional application No. 60/047,514, May 23, 1997.

[51] Int. Cl.$^6$ ........................................... G01S 5/02
[52] U.S. Cl. ............................................ 342/427; 342/149
[58] Field of Search ...................... 342/427, 149

[56] References Cited

U.S. PATENT DOCUMENTS

| | | |
|---|---|---|
| 4,368,468 | 1/1983 | Lisle et al. . |
| 4,628,321 | 12/1986 | Martin .................................... 342/379 |
| 4,646,095 | 2/1987 | Kanter .................................... 342/149 |
| 4,713,666 | 12/1987 | Poux . |

FOREIGN PATENT DOCUMENTS 06331720  12/1994  Japan .

OTHER PUBLICATIONS

Goudey, "A New Angle Estimator for Radar Tracking of Extended Targets", 1981 IEEE, 0547–3578/81/0000–0498, pp. 498–504.

*Primary Examiner*—Theodore M. Blum
*Attorney, Agent, or Firm*—Baker & Botts, L.L.P.

[57] ABSTRACT

A system and method for estimating azimuth angle, elevation angle and signal detection and which includes an antenna system having a plurality of elements, each element receiving a different concurrent portion of an incoming analog signal having a real and an imaginary portion. A converter is provided for each antenna element for converting each analog signal to digital form. A processor is provide for multiplying the sum of the real parts of the signals from a first group of the elements with the conjugate of the sum of the remainder of the elements to provided an estimated azimuth, elevation of signal detection measurement. In the case of a four element antenna, AzEst=Angle$((A+B)^*(C+D)$Conjugate$))=(x_A+iy_A+x_B+iy_B)^*(x_C-iy_C+x_D-iy_D)$, ElEst=Angle$((A+D)^*(B+C)$Conjugate$))=(x_A+iy_A+x_D+iy_D)^*(x_B-iy_B+x_C-iy_C)$ and Magnitude $((A+B^*(C+D)$Conjugate$))$ or Magnitude $((A+D^*(B+C)$Conjugate$))$. When the antenna system includes four antenna quadrants A, B, C and D, false detections due to responses coming from the sidelobe regions are suppressed by subtracting the offset OffsetAz=ScaleFactor*Magnitude(DeltaAz), where the offset is a scale factor to make the numbers come out correctly to provide a synthetic beam response: SyntheticAz=Magnitude$((A+B)^*(C+D)$Conjugate$)$−OffsetAz the processor further including a comparator for comparing the Synthetic Az to a threshold to determine validity of the signal.

32 Claims, 1 Drawing Sheet

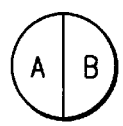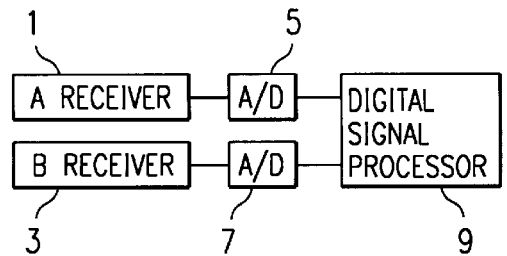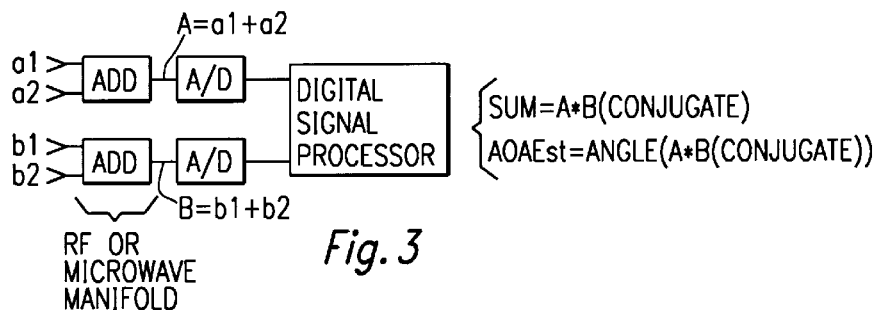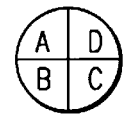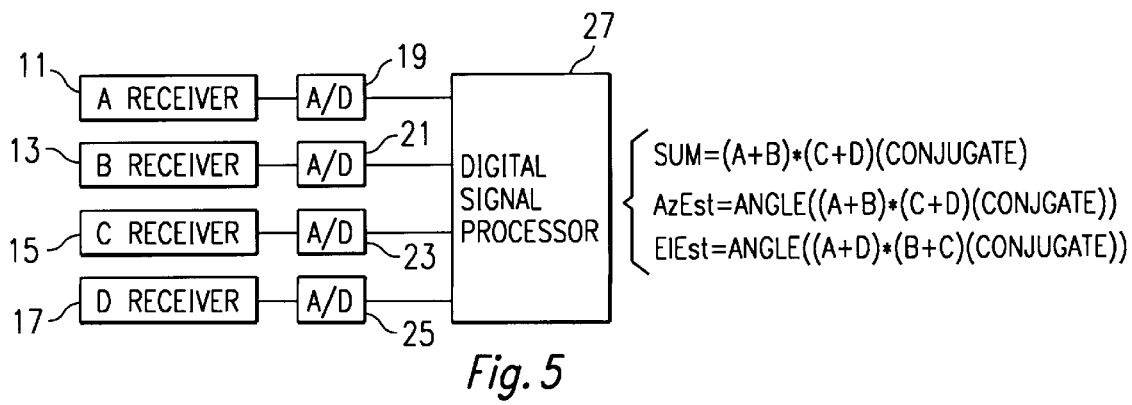

METHOD FOR IMPROVING MONOPULSE PROCESSING OF APERTURE SEGMENT OUTPUTS

CROSS REFERENCE TO RELATED APPLICATIONS

This application claims priority under 35 U.S.C §119 of application number 60/047,514 filed May 23, 1997 entitled "Method for Improving Monopulse Processing of Aperture Segment Outputs.

BACKGROUND OF THE INVENTION

1. Field of the Invention

This invention relates to a method of estimating the angle of arrival of a signal at an antenna to an accuracy that is a small fraction of the antenna aperture beamwidth.

2. Background of the Invention

In the field of antenna design, it is known that the ratio of wavelength (WL) to antenna diameter (D), (wherein "antenna diameter" can refer to dimensions other than the diameter in the case of non-circular antennas as is well known in the art and generally is a function of the antenna area) determines the resolving power for that antenna, assuming a conventional approach.

Monopulse processing is an unconventional approach that has been used for several decades to improve the standard angular resolution limit of the antenna which is WL/D (measured in radians). Monopulse effectively divides the antenna aperture into segments. Multiple linear combinations of segment outputs are formed. Nonlinear operations on these linear combinations are performed. One output normally defines the elevation angle of arrival (AOA-el) of the signal relative to boresight and another output defines the azimuth angle of arrival (AOA-az) of the signal relative to boresight.

Consider a four quadrant aperture in accordance with the prior art, and assume the aperture quadrants are labelled A, B, C and D in a counterclockwise direction commencing with the upper left (FIG. 3) with the elevation direction being from quadrant B toward quadrant A or quadrant C toward quadrant D and the azimuth direction being from quadrant B toward quadrant C or quadrant A to quadrant D. Standard monopulse processing forms: a sum beam wherein sum=Real(A+B+C+D), an azimuth difference beam wherein DeltaAz=Imaginary((A+B)−(C+D)) and an elevation difference beam wherein DeltaEl=Imaginary((A+D)−(B+C)).

Signal detection is typically performed by amplitude testing the quantity Sum*SumConjugate where "Conjugate" has its standard mathematical meaning, namely that the imaginary portion of the signal is of opposite sign to the quantity which is not the conjugate.

Azimuth angle estimation is computed as: AzEst= (DeltaAz*SumConjugate)/(Sum*SumConjugate) for amplitude monopulse, or as AzEst=arctangent (DeltaAz/Sum) for phase monopulse.

Elevation angle estimation is computed as: ElEst= (DeltaEl*SumConjugate)(Sum*SumConjugate) for amplitude monopulse, or as ElEst=arctangent (DeltaEl/Sum) for phase monopulse.

In standard monopulse processing, a division is required in order to estimate target angle of arrival (AOA) within the main beam. Usually, this requires that the signal to noise ratio (SNR) be upward of 10 dB to insure an extremely small probability of dividing by zero or a number close to zero.

The prior art systems which use the above described functions require an additional antenna in the array, an additional manifold and receiver channel or a separate array for the purpose of blanking or cancellation of sidelobes.

SUMMARY OF THE INVENTION

In accordance with the present invention, there is provided a system and method for signal analysis via an antenna aperture wherein the requirement of a separate antenna element in the array, separate manifold, or a separate array for cancellation and/or blanking of sidelobe signals is eliminated. The present invention utilizes different operations to estimate the same quantities to provide the improved results. In accordance with the present invention, there is no division. The nonlinear operation used instead of division is multiplication of complex quantities. This operation is performed with very little SNR loss due to nonlinearity effects down to input SNRs as low as 0 to +3 dB. The complex product has real and imaginary components that are quite stable for the desired signal response. Thus, coherent integration on the real and imaginary components can be performed for significant and efficient SNR gain.

Post detection integration for conventional monopulse frequently is assumed to improve SNR only as the square root of N, the number of pulses integrated. In contrast, with assurance of a minimum of 0 to +3 dB SNR where the complex multiplication is performed, SNR growth is obtained as N, not the square root of N.

Because the approach in accordance with the present invention never forms a full aperture sum beam, only half aperture beams, there is an initial penalty of 3 dB in SNR. However, the fact that SNR grows as N rather than as the square root of N means that the 3 dB initial penalty is soon more than offset. For example, if 20 samples are integrated, a 13 dB SNR gain is provided for the new approach, but only 6.5 dB gain for standard monopulse. Thus, the net improvement for the approach in accordance with the present invention is 13−6.5−3=3.5 dB.

All else being equal, the approach in accordance with the present invention also has an advantage in permitting a wider predetection bandwidth for the same final SNR. To reach 15 dB final SNR, standard monopulse must have approximately 10 dB at the detector and count on improvement of 5 dB through noncoherent integration (which takes about 10 samples of integration). To reach 15 dB final SNR, the approach in accordance with the present invention can have 3 db SNR at its detector (which means predetection bandwidth can be a factor of 5 wider than for standard monopulse) and obtain another 12 dB through coherent integration following the correlation detector.

The present invention addresses at least three principal issues that are important performance limitations. The first such issue concerns how signal to noise ratio (SNR) is affected by the nonlinear operations required by standard monopulse processing and a different nonlinear operation. The second issue concerns a critical feature of antenna apertures, namely suppression of multiple undesirable effects due to antenna sidelobes. The third issue concerns producibility, namely how close must amplitude and phase be matched among all aperture elements in order to attain required levels of sidelobe suppression, beamwidth and gain.

Relative to standard monopulse, the present invention offers significant improvements in all of the above three discussed areas. Monopulse SNR performance is improved. Also, sidelobe performance characteristics are improved. Extended processing permitted by the approach in accordance with the present invention produces useful results with two receiver channels per monopulse plane (azimuth or elevation) that would require at least three channels with the conventional monopulse approach.

An example of a commercial use for the antenna in accordance with the present invention is in cellular communications. If the base station antenna can discriminate against certain transmitters based upon the angle of arrival of the signal, then the number of allowable users for a particular antenna can be increased, thereby increasing efficiency of the system.

A principal element of the present invention is defined herein as the correlation beam. The correlation beam is obtained by forming the complex product of the output of one half the aperture times the complex conjugate of the output of the other half of the aperture. This is done for a two-dimensional aperture by forming the complex product of the right half times the complex conjugate of the left half for azimuth angle estimation and detection and using the upper half times the complex conjugate of the lower half for elevation angle estimation.

Azimuth angle estimation is computed from the azimuth correlation beam as, where "Angle" is defined as the angle relative to boresight:

$$AzEst=\text{Angle}((A+B)^*(C+D)\text{Conjugate}))=\text{Angle } ((x_A+iy_A+x_B+iy_B)^*(x_C-iy_C+x_D-iy_D))$$

Elevation angle estimation is computed from its corresponding correlation beam as:

$$ElEst=\text{Angle}((A+D)^*(B+C)\text{Conjugate}))=\text{Angle } ((x_A+iy_Ax_D+iy_D)^*(x_B-iy_B+x_C-iy_C))$$

Signal detection is performed on either of the two correlation beams as follows:

Magnitude $((A+B^*(C+D)\text{Conjugate}))$ or Magnitude $((A+D^*(B+C)\text{Conjugate}))$.

False detections due to responses coming from the sidelobe regions are suppressed by the following creating a bias offset by scaling the standard monopulse response: OffsetAz=ScaleFactor*Magnitude(DeltaAz).

A synthetic beam response is formed by subtracting this bias offset from the new version of the azimuth response beam in accordance with: SyntheticAz=Magnitude((A+B)*(C+D)Conjugate)−OffsetAz.

This SyntheticAz response is compared to a threshold. If positive, then the signal is declared valid, having originated within the mainlobe beam response region. If negative, then the signal is declared invalid, having originated within the sidelobe regions, and is neglected. If the signal is declared valid, then the usual AzEst equation is used to compute the azimuth angle of arrival, not the SyntheticAz beam response. The synthetic response is used only for judging whether the signal came from the main beam region or the sidelobe region. This technique permits a two channel receiver to perform its own guard function.

The above described technique applies as well to guarding the elevation beam response. Use of the standard sum beam response or the standard difference beam response does not require any new data to be accumulated. Both responses can be obtained from the same complex data that was used to generate the correlation beam.

The hardware required to provide the above described operations involves an antenna with N segments, preferably a two or four segment antenna. Each antenna segment is coupled to a receiver for receiving the signal from the associated segment of the antenna. Each receiver is coupled to an analog to digital (A/D) converter to convert the received signal to a digital value. These digital values are sent to a processor which analyzes the real and imaginary portions of each of the received signals and then provides each of the required outputs for operation of the above described equations and also provides the solution to each of the above described equations with appropriate software which is well known.

In accordance with the present invention, a SNR improvement is enabled due to coherent rather than noncoherent integration. In addition, sidelobe suppression is provided using either coherent or noncoherent processing, while only requiring as few as two receiver channels. There is further provided an ability to recognize and reject signals originating outside the mainbeam beamwidth with as few as two receiver channels (sidelobe blanking, the guard function). Further, the signal is more producible due to increased tolerance of antenna element gain and phase mismatch. In addition, there is an ability to produce a required detection SNR with a significantly higher predetection bandwidth to increase operational flexibility by reducing requirements on oscillator stability, number of frequency channels, etc.

BRIEF DESCRIPTION OF THE DRAWINGS

FIG. 1 is a schematic diagram of an antenna system having two elements, A and B, for the purpose of receiving radiations from a target in the azimuth direction;

FIG. 2 is a circuit diagram of a system for receiving and digitally processing received radiations in accordance with the present invention with an antenna array of the type shown in FIG. 1;

FIG. 3 is a schematic diagram of an antenna system having a linear array;

FIG. 4 is a schematic diagram of an antenna system having four elements, A, B, C and D; and FIG. 5 is a circuit diagram of a system for receiving and digitally processing received radiation in accordance with the present invention with an antenna array of the type shown in FIG. 3.

DESCRIPTION OF THE PREFERRED EMBODIMENT

While the procedures herein can be carried out for any number of antenna elements, preferably an even number of such elements, and while the above discussion is directed to a four element antenna, the principal of operation in accordance with the present invention is demonstrated for elevation alone or azimuth alone using an antenna with two segments, A and B, as shown in FIG. 1 for a target moving in the azimuth direction. It should be understood that the system can be easily expanded to any number of antenna elements. The antenna segments may consist of any number of elements. As shown in FIG. 2, segment A is coupled to an A receiver 1 and the antenna element B is coupled to a B receiver 3. The signal received by the A receiver 1 is converted from analog to digital by an analog to digital (A/D) converter 5 and the signal received by the B receiver 3 is converted from analog to digital by an A/D converter 7. Both sets of digitized signals from the A/D converters 5 and 7 are then sent to a processor 9 for processing in accordance with the following equations:

Angle Estimate=Angle $(A^*B(\text{Conjugate}))$=Angle $((x_A+iy_A)^*(x_B-iy_B))$ Detection is performed on the signal formed by:

$$\text{Magnitude }(A*B(\text{Conjugate}))$$

Referring now to FIG. 3 the is shown a linear antenna array that has an even number of elements. The aperture is split in half and each half is used to form a beam by adding the elements together in a microwave network using known art. The two outputs that result from this addition are converted from analog to digital format by an A/D converter operating above the Nyquist rate for the input signal bandwidth. The digital information, which includes both amplitude and phase of the signal, is used to calculate a magnitude (Sum) estimate and an angle of arrival (AOA) estimate as shown in FIGS. 1 and 2. Even though only four elements are shown in FIG. 3, the technique can readily be extended to larger arrays containing more elements by simply adding the additional elements in each half with a microwave network. The processing in the processor after the A/D conversion is identical, regardless of the number of elements in the array.

In the case of a two-dimensional array, the array may include many elements arranged in a geometric pattern as shown in FIG. 4. The array may be circular, elliptical, square or rectangular. The array processing is accomplished in a manner similar to the processing used for a linear array. First, outputs of the antennaelements in each quadrant of the array are added together in a microwave network, forming four distinct outputs or channels, designated A, B, C and D. Each of these outputs may be fed to a receiver channel, A/D converted and processed according to the method illustrated and described above. Magnitude estimates and two-dimensional angle estimates are formed by processing these channel signals according to the methods disclosed hereinabove. This is demonstrated in FIG. 5 wherein the signals from each antenna element are sent to separate receivers 11, 13, 15 and 17, converted from analog to digital form in converters 19, 21, 23 and 25 and then processed in processor 27 in accordance with the above equations for use in conjunction with antenna elements A, B, C and D as set forth hereinabove in standard manner.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A system for estimating azimuth angle which comprises:
   (a) an antenna system having a plurality of elements, each of said elements receiving a different concurrent portion of an incoming analog signal having a real and an imaginary portion;
   (b) a converter for each said antenna element for converting each said analog signal to digital form; and
   (c) a processor for multiplying the sum of the real and imaginary parts of said signals from a first group of said elements with the sum of the conjugates of the real and imaginary parts of said signals from the remainder of said elements to provide an estimated azimuth measurement;
   where "group" includes one and where "angle" is defined as the angle relative to boresight.

2. The system of claim 1 wherein said antenna system includes four antenna elements A, B, C and D and where $\text{AzEst}=\text{Angle}((A+B)*(C+D)\text{Conjugate}))=\text{Angle})(x_A+iy_A+x_B+iy_B)*(x_C-iy_C+x_D-iy_D))$.

3. A system for estimating elevation angle which comprises:
   (a) an antenna system having a plurality of elements, each of said elements receiving a different concurrent portion of an incoming analog signal having a real and an imaginary portion;
   (b) a converter for each said antenna element for converting each said analog signal to digital form; and
   (c) a processor for multiplying the sum of the real and imaginary parts of said signals from a first group of said elements with the sum of the conjugate of the real and imaginary parts of said signals from the remainder of said elements to provide an estimated elevation measurement;
   where "group" includes one and where "angle" is defined as the angle relative to boresight.

4. The system of claim 3 wherein said antenna system includes four antenna elements A, B, C and D and where $\text{ElEst}=\text{Angle}((A+D)*(B+C)\text{Conjugate}))=\text{Angle}((x_A+iY_A+x_D+iY_D)*(x_B-iY_B+x_C-iY_C))$.

5. A system for signal detection which comprises:
   (a) an antenna system having a plurality of elements, each of said elements receiving a different concurrent portion of an incoming analog signal having a real and an imaginary portion;
   (b) a converter for each said antenna element for converting each said analog signal to digital form; and
   (c) a processor for multiplying the sum of the real and imaginary parts of said signals from a first group of said elements with the sum of the conjugates of the real and imaginary parts of said signals from the remainder of said elements to provide a signal detection measurement;
   where "group" includes one.

6. The system of claim 5 wherein said antenna system includes four antenna elements A, B, C and D and where the magnitude of said signal is Magnitude $((A+B)*(C+D)\text{Conjugate}))$.

7. The system of claim 5 wherein said antenna system includes four antenna elements A, B, C and D and where the magnitude of said signal is Magnitude $((A+D)*(B+C)\text{Conjugate}))$.

8. The system of claim 5 wherein said antenna system includes four antenna elements A, B, C and D and wherein false detections due to responses coming from the sidelobe regions are suppressed by using the offset OffsetAz=ScaleFactor*Magnitude(DeltaAz), where the offset is a scale factor, to determine a synthetic beam response: SyntheticAz=Magnitude$((A+B)*(C+D)\text{Conjugate})$-OffsetAz, said processor further including a comparator for comparing said SyntheticAz to a threshold to determine validity of said SyntheticAz.

9. A method for estimating azimuth angle which comprises:
   (a) providing an antenna system having a plurality of elements, each of said elements receiving a different concurrent portion of an incoming analog signal having a real and an imaginary portion;
   (b) providing a converter for each said antenna element for converting each said analog signal to digital form; and
   (c) multiplying the sum of the real and imaginary parts of said signals from a first group of said elements with the sum of the conjugates of the real and imaginary parts of said signals from the remainder of said elements to provide an estimated azimuth measurement;

where "group" includes one and where "angle" is defined as the angle relative to boresight.

10. The method of claim 9 wherein said antenna system is provided with four antenna elements A, B, C and D and where AzEst=Angle((A+B)*(C+D)Conjugate))=Angle $((x_A+iy_A+x_B+iy_B)*(x_C-iy_C+x_D-iy_D))$.

11. A method for estimating elevation angle which comprises:
   (a) providing an antenna system having a plurality of elements, each of said elements receiving a different concurrent portion of an incoming analog signal having a real and an imaginary portion;
   (b) providing a converter for each said antenna element for converting each said analog signal to digital form; and
   (c) multiplying the sum of the real and imaginary parts of said signals from a first group of said elements with the sum of the conjugates of the real and imaginary parts of said signals from the remainder of said elements to provide an estimated elevation measurement;
where "group" includes one and where "angle" is defined as the angle relative to boresight.

12. The method of claim 11 wherein said antenna system is provided with four antenna elements A, B, C and D and where ElEst=Angle((A+D)*(B+C)Conjugate))=Angle($(x_A+iy_A+x_D+iy_D)*(x_B-iY_B+x_Ciy_C)$).

13. A method for signal detection which comprises:
   (a) providing an antenna system having a plurality of elements, each of said elements receiving a different concurrent portion of an incoming analog signal having a real and an imaginary portion;
   (b) providing a converter for each said antenna element for converting each said analog signal to digital form; and
   (c) multiplying the sum of the real and imaginary parts of said signals from a first group of said elements with the sum of the conjugates of the real and imaginary parts of said signals from the remainder of said elements to provide an estimated signal detection measurement; where "group" includes one.

14. The method of claim 13 wherein said antenna system is provided with four antenna elements A, B, C and D and where the magnitude of said signal is Magnitude ((A+B)*(C+D)Conjugate).

15. The method of claim 13 wherein said antenna system is provided with four antenna elements A, B, C and D and where the magnitude of said signal is Magnitude ((A+D)*(B+C)Conjugate).

16. The method of claim 13 wherein said antenna system is provided with four antenna elements A, B, C and D and wherein false detections due to responses coming from the sidelobe regions are suppressed by using the offset OffsetAz=ScaleFactor*Magnitude(DeltaAz), where the offset is a scale factor, to determine a synthetic beam response: SyntheticAz=Magnitude((A+B)*(C+D)Conjugate)- OffsetAz, said processor further including a comparator for comparing said SyntheticAz to a threshold to determine validity of said SyntheticAz.

17. A system comprising:
   an antenna section having a plurality of segments which each produce a respective analog signal in response to an incoming signal, each of said analog signals including real and imaginary information;
   an analog to digital converter section operative to convert each of said analog signals into a respective digital signal which includes real and imaginary information; and
   a processor operative to identify first and second subsets of said digital signals which are different, and operative to multiply first digital information by second digital information in order to obtain third digital information, said first digital information being a function of each said digital signal in said first subset, and said second digital information being a function of the conjugate of each said digital signal in said second subset.

18. A system according to claim 17, wherein said processor is further operative to determine an angle as a function of said third digital information.

19. A system according to claim 17, wherein said processor is further operative to carry out sidelobe suppression as a function of said third digital information.

20. A system according to claim 17, wherein said segments include first and second segments, and said digital signals include first and second digital signals which correspond respectively to said first and second segments, said first subset including said first digital signal, said first digital information being said first digital signal, said second subset including said second digital signal, and said second digital information being a conjugate of said second digital signal.

21. A system according to claim 17, wherein said segments include first, second, third and fourth segments, and wherein said digital signals include first, second, third and fourth digital signals which respectively correspond to said first, second, third and fourth segments, said first subset including said first and second digital signals, said first digital information being a sum of said first and second digital signals, said second subset including said third and fourth digital signals, and said second digital information being a sum of the conjugates of said third and fourth digital signals.

22. A system according to claim 21, wherein said processor is further operative to determine an angle as a function of said third digital information.

23. A system according to claim 21, wherein said processor is further operative to multiple fourth digital information by fifth digital information in order to obtain sixth digital information, said fourth digital information being a sum of said first and fourth digital signals, and said fifth digital information being a sum of the conjugates of said second and third digital signals.

24. A system according to claim 23, wherein said processor is further operative to determine a first angle as a function of said third digital information, and to determine a second angle as a function of said sixth digital information.

25. A method, comprising the steps of:
   producing from each of a plurality of segments of an antenna a respective analog signal in response to an incoming signal, each of said analog signals including real and imaginary information;
   converting each of said analog signals into a respective digital signal which includes real and imaginary information;
   identifying first and second subsets of said digital signals which are different; and
   multiplying first digital information by second digital information in order to obtain third digital information, said first digital information being a function of each said digital signal in said first subset, and said second digital information being a function of the conjugate of each said digital signal in said second subset.

26. A method according to claim 25, further including the step of determining an angle as a function of said third digital information.

27. A method according to claim 25, further including the step of carrying out sidelobe suppression as a function of said third digital information.

28. A method according to claim 25, wherein said segments include first and second segments, wherein said digital signals include first and second digital signals which correspond respectively to said first and second segments, and wherein said identifying step is carried out by including said first digital signal in said first subset and said second digital signal in said second subset, said first digital information being said first digital signal, and said second digital information being the conjugate of said second digital signal.

29. A method according to claim 25, wherein said segments include first, second, third and fourth segments, wherein said digital signals include first, second, third and fourth digital signals which respectively correspond to said first, second, third and fourth segments, and wherein said identifying step is carried out by including said first and second digital signals in said first subset and by including said third and fourth digital signals in said second subset, said first digital information being a sum of said first and second digital signals, and said second digital information being a sum of the conjugates of said third and fourth digital signals.

30. A method according to claim 29, including the step of determining an angle as a function of said third digital information.

31. A method according to claim 29, including the further step of multiplying fourth digital information by fifth digital information in order to obtain sixth digital information, said fourth digital information being a sum of said first and fourth digital signals, and said fifth digital information being a sum of the conjugates of said second and third digital signals.

32. A method according to claim 31, including the steps of determining a first angle as a function of said third digital information, and determining a second angle as a function of said sixth digital information.

* * * * *

UNITED STATES PATENT AND TRADEMARK OFFICE
CERTIFICATE OF CORRECTION

PATENT NO. : 5,986,605
DATED : November 16, 1999
INVENTOR(S) : Leslie A. Priebe et al.

Page 1 of 1

It is certified that error appears in the above-identified patent and that said Letters Patent is hereby corrected as shown below:

Title page,
Item [57], line 10, after "to", delete "provided", and insert -- provide --.

Column 3,
Line 31, after second "Angle", delete
"$((x_A + iy_A x_D + iy_D))$" and insert
-- $((x_A + iy_A + x_D + iy_D))$ --.

Column 5,
Line 24, after "the", delete "antennaelements", and insert -- antenna elements --.

Column 6,
Line 19, after second "Angle", delete
"$((x_A + iY_A + x_D + iY_D)*(x_B - iY_B + x_C - iY_C))$"
and insert
-- $((x_A + iy_A + x_D + iy_D)* (x_B - iy_B + x_C - iy_C))$ --.

Column 7,
Line 25 after "*", delete
"$(x_B - iY_B + x_C iy_C))$"
and insert
-- $(x_B - iy_B + x_C - iy_C))$ --.

Signed and Sealed this

Twenty-fifth Day of December, 2001

*Attest:*

*Attesting Officer*

JAMES E. ROGAN
*Director of the United States Patent and Trademark Office*